Figure 1:
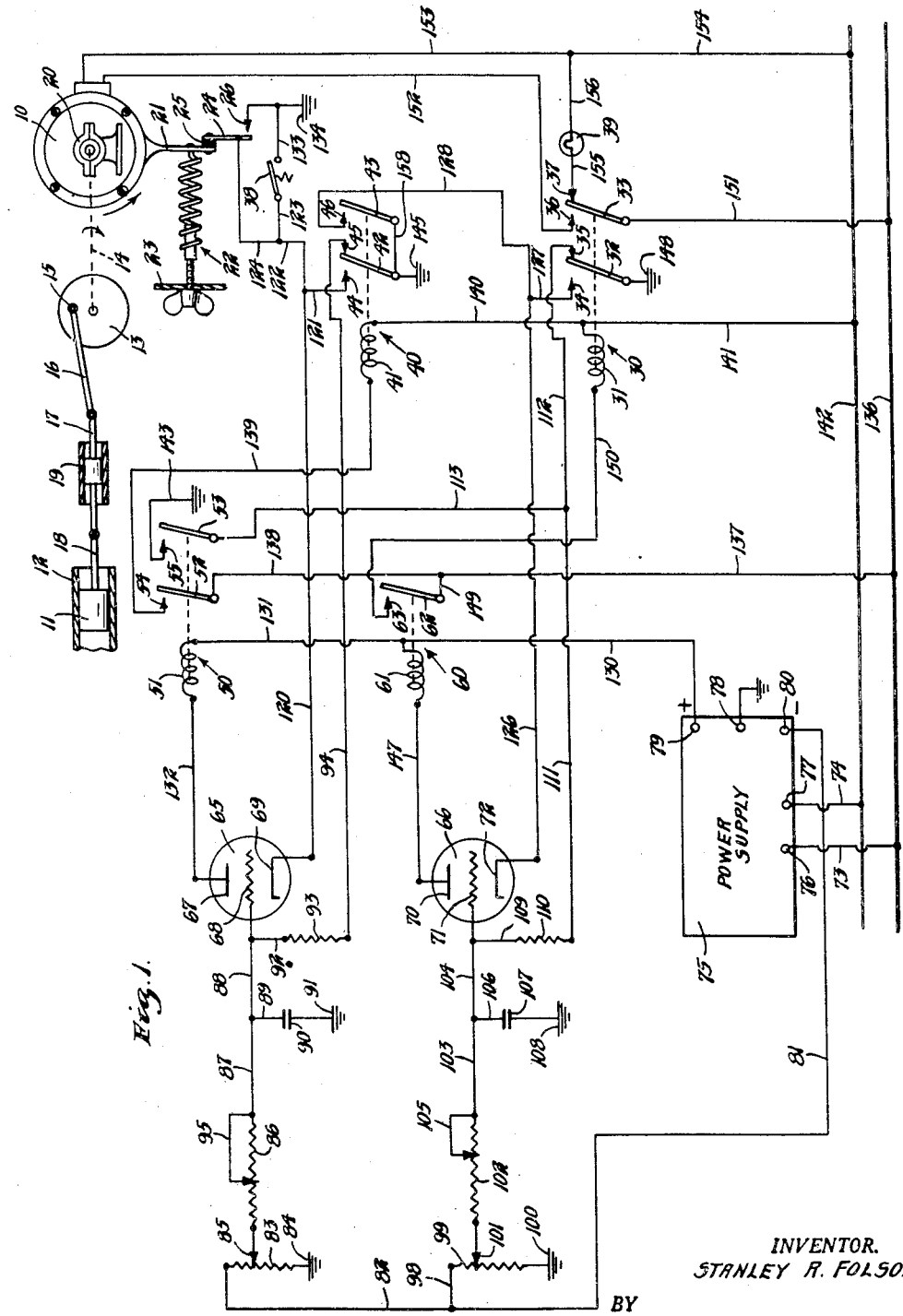

INVENTOR.
STANLEY R. FOLSOM
BY George H. Fisher
ATTORNEY

July 19, 1949.                S. R. FOLSOM                2,476,851
                          MOTOR CONTROL APPARATUS
Filed April 21, 1945                                 2 Sheets-Sheet 2
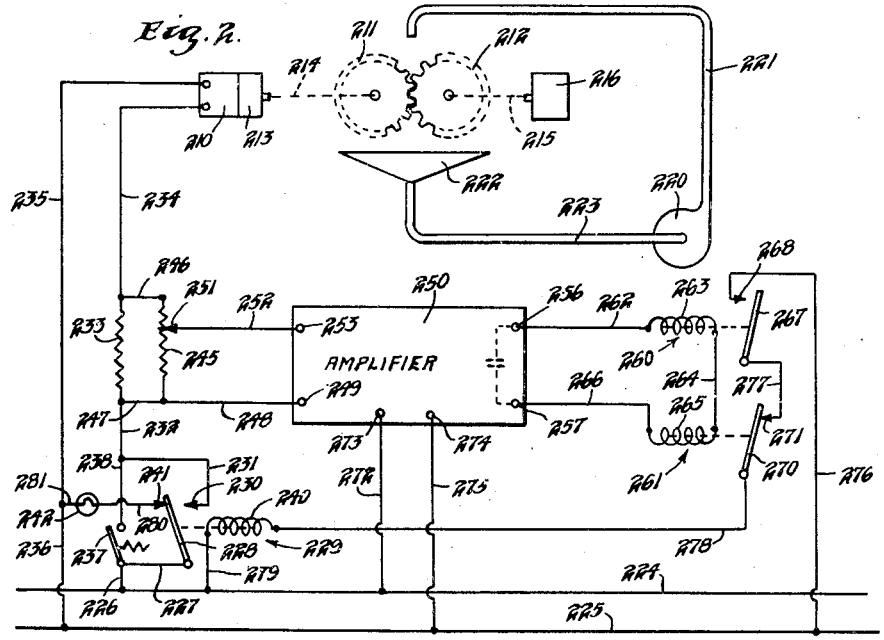
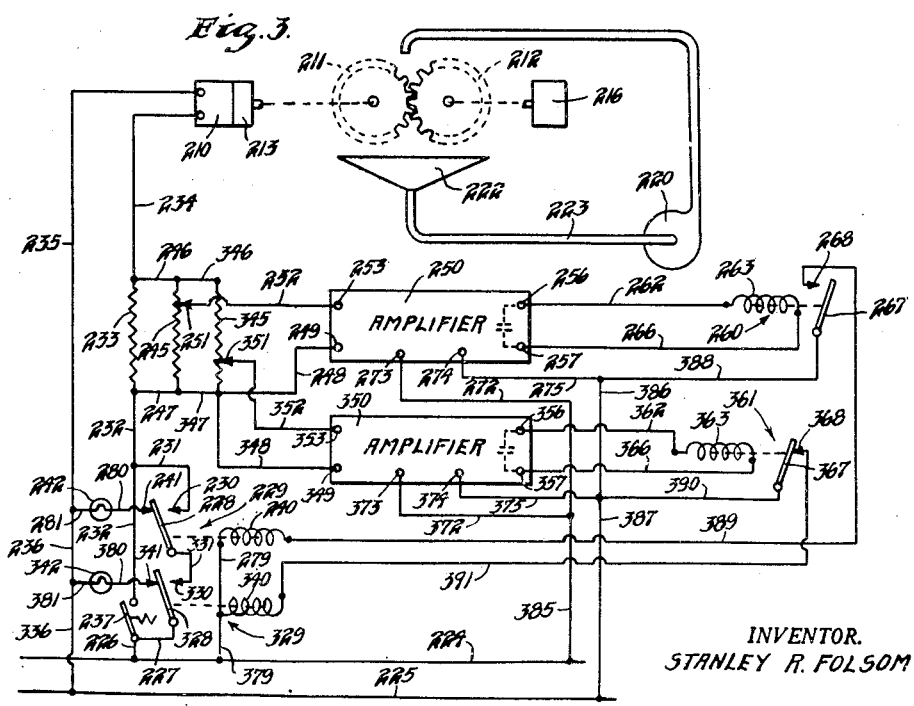
INVENTOR.
STANLEY R. FOLSOM
BY George H. Fisher
     ATTORNEY Patented July 19, 1949

2,476,851

UNITED STATES PATENT OFFICE 2,476,851

MOTOR CONTROL APPARATUS

Stanley R. Folsom, Minneapolis, Minn., assignor to Minneapolis-Honeywell Regulator Company, Minneapolis, Minn., a corporation of Delaware Application April 21, 1945, Serial No. 589,476

17 Claims. (Cl. 51—165)

The present invention concerns apparatus for automatically terminating certain precision machining operations and the like.

Great progress has been made in the art of machining metal and other such materials, both in the rate of doing the work and the quality of the work produced. However, with all the advance that has been made, the well-known process of lapping is still required for work of great precision and for the proper interfitting of parts having very small clearances. By its very nature, lapping is a slow process and therefore costly, hence its use has not been as extensive as it should be.

The present invention, without modifying in the least the actual lapping process, has improved uniformity and quality of work, lowered costs, and increased production spectacularly by automatically stopping the process when predetermined results, such as interfit, are produced.

It is therefore a principal object of the present invention to provide means for automatically stopping a machine operation, such as lapping, when desired results are obtained.

It is a further object to stop the driving motor of a machine running-in parts to a predetermined fit when the load on the motor decreases to a value indicating the attainment of the desired fit.

It is a further object to stop a machine operation when desired results are obtained and to indicate the completion of the work.

In many machine operations, the load on the driving motor cyclically varies, thus making it difficult to interpret the results of the machine operation in terms of motor load. As an instance of this, the load on a motor driving reciprocating lapping means varies from a minimum at the ends of the lapping strokes to a maximum near the mid-point of the strokes. The problem is often further complicated by variations in the peak resistance of one stroke relative to another. As will be pointed out in the description which follows, the present apparatus considers all of these factors.

It is thus an additional object to provide apparatus for controlling the driving means of a machine in response to the maximum loads on said driving means.

It is also an object to provide apparatus for controlling the driving means of a machine in response to the maximum load during a predetermined time period.

It is likewise an object to provide apparatus for controlling the driving means of a machine having operating cycles in response to the maximum load during a predetermined number of cycles.

In many machine operations, such as lapping small parts, relatively little power is used and the power variations are likewise small.

The present invention thus has another object, the providing of easily adjusted, sensitive and quickly responsive electronic motor control apparatus which is equally adaptable to large or small machines.

It is an additional object to provide means for not only stopping the driving motor of a machine when its task is completed, but also which stops the motor when the load is undesirably high, thus protecting the means being lapped or the motor from being damaged and also preventing the waste of machine time on articles not yet ready for lapping.

Further, it is an object to provide sensitive and quickly responsive high load limiting means for motors generally so that certain machine operations, process operations, and the like can be stopped under predetermined conditions.

These and other objects will become apparent upon a study of the following specification and drawings wherein:

Figure 1 schematically shows the present apparatus applied to a lapping machine having a reciprocal motion.

Figure 2 schematically shows a modification of the present apparatus applied to lapping means having a uniform rotary motion.

Figure 3 shows apparatus similar to that of Figure 2, but providing for separate electronic control of the motor under high load conditions.

Referring to Figure 1, a geared electric motor means 10 is the source of power for mechanism, to be described, which reciprocates member 11 in member 12. In this description, it will be considered that members 11 and 12 are suitably charged with lapping material and member 11 is reciprocated relative to member 12 until the fit between the parts is that desired.

This operation, commonly known as lapping, is a common one for the final machining of closely fitting precision made parts which must work together smoothly and with a minimum of clearance. By its nature, lapping is a slow process but, as will be seen, the present apparatus effectively reduces the time for the operation by stopping it as soon as the desired results are obtained.

To reciprocate member 11, geared motor 10 drives disk 13, mounted on shaft 14, and which disk carries crank pin 15. Crank pin 15 is connected by connecting rod 16 and links 17 and 18 to member 11, link 17 being guided by crosshead 19 to prevent side thrusts and the like from being exerted on member 11.

Motor means 10 is pivotally mounted to support members 20 (only one of which is shown) and hence is free to rotate, except for adjustable restraining means. A projecting member 21 extending from the stator of motor 10 has attached thereto one end of adjustable spring means 22, the other end of spring means 22 being secured to a stationary member 23. As shown, when motor 10 drives shaft 14 in a clockwise direction, arm 21 tends to move in a counterclockwise direction, this tendency being resisted by spring means 22. A flexible switch blade 24 is secured to the end of member 21 and insulated therefrom by insulation 25. Switch blade 24 coacts with contact 26 for a purpose which will appear.

Control of the current supply of motor 10 is effected by relay means 30, said relay including a winding 31, switch blades 32 and 33, "in" contacts 34 and 36, and "out" contacts 35 and 37. Contacts 34 and 35 are engageable by blade 32 and contacts 36 and 37 are engageable by blade 33.

A similar relay 40, associated with relay 30, includes winding 41, blades 42 and 43, "in" contacts 44 and 46, and "out" contact 45. Contacts 44 and 45 are engageable by blade 42 and contact 46 is engageable by blade 43. The function of relays 30 and 40 will become more clear as the description proceeds.

The energization of relay 40 is controlled by plate circuit relay 50 which includes winding 51, switch blades 52 and 53, and "in" contacts 54 and 55 engageable by their respective blades. The energization of relay 30 is controlled by plate circuit relay 60 having a winding 61 and a switch blade 62 engageable with an "in" contact 63. Relays 50 and 60 may be of any sort actuatable by the plate current of an electronic discharge device such as triode tubes 65 or 66.

A normally open manually operated switch 38 and a signal light 39 are also associated with the control of motor 10.

While tubes 65 and 66 are shown as separate electronic discharge devices for convenience, as a practical manner of practicing the present invention, excellent results have been obtained by using a single duo-triode tube, such as a 7N7, instead. The connections and functions are the same in either event. Tube 65 includes an anode 67, a control element or grid 68, and a cathode 69. Tube 66 includes an anode 70, a control element 71, and a cathode 72. The cathode heaters and their energizing circuits have been omitted in the present description because their function is conventional and they play no part in the present circuits.

A power supply unit 75 includes input terminals 76 and 77 connected to a suitable source of electric current, in this a 110 volt, 60 cycle line, by the circuit: line wire 136, wire 73, terminal 76, terminal 77, wire 74, and line wire 142. The output terminals of unit 75 include grounded terminal 78, a positive terminal 79 and a negative terminal 80. Terminal 79 is connected to the plate circuits of tubes 65 and 66, hence is at a suitably high potential for this purpose. Terminal 80 provides the negative bias voltage for the above tubes, hence is at a sufficient negative potential for this purpose.

To provide a bias voltage for grid 68 of tube 65, resistor 83 is energized by the following circuit: grounded terminal 78 of power supply 75, ground 84, resistor 83, wire 82, wire 81, and negative terminal 80 of said power supply. This causes a potential drop across said resistor 83. An adjustable contact or wiper 85 is adjusted along resistor 83 to a point providing the desired bias voltage for said grid 68, said wiper being connected to said grid by resistor 86, wire 87, and wire 88. Adjustable wiper means 95 determines the effective value of resistor 86. Grid 68 is also connected to ground by the circuit: grid 68, wire 88, wire 89, capacitor 90, and ground 91. In addition, grid 68 is connected to ground by the circuit: grid 68, wire 92, resistor 93, wire 94, contact 45, switch blade 42, and ground 145. This latter connection provides a shunt around capacitor 90 and resistor 83 to ground when said connection is complete. The relation of resistance, capacitance and bias voltage will provide a time factor of value in a manner to be later described.

Bias voltage for grid 71 of tube 66 is provided in a similar manner. Resistor 99 is energized by the circuit: grounded terminal 78 of power supply 75, ground 100, resistor 99, wire 98, wire 81, and negative terminal 80 of said power supply. A proper bias voltage can then be obtained by properly adjusting wiper means 101 along said resistor 99. Wiper or contact means 101 is connected to grid 71 through adjustable resistor 102, wire 103, and wire 104. Wiper 105 determines the effective resistance of resistor 102. Grid 71 is connected to ground by the circuit: grid 71, wire 104, wire 106, capacitor 107, and ground 108. Another connection to ground is: grid 71, wire 109, resistor 110, wire 111, wire 112, contact 35, switch blade 32, and ground 148. Still another possible connection to ground is: grid 71, wire 109, resistor 110, wire 111, wire 113, blade 53, contact 55, and ground 143. These latter connections provide shunt circuits around capacitor 107 and resistor 99, under conditions to be described. A time factor results from the relation of resistance, capacitance and bias voltage in the same manner as the above illustration.

In a practical embodiment of the present invention, resistors 83 and 99 were each of .5 megohm resistance; resistors 86 and 102 were each adjustable in resistance from 0 to 50 megohms, and resistors 93 and 110 were each of 10,000 ohms resistance. Capacitors 90 and 107 were each of 2 microfarads capacity. The above values are given only as illustrations and are, of course, not to be considered in a limiting sense. There are many factors to be considered in the design of any electronic apparatus and the values of many of the components of the apparatus are subject to variation without losing the function of the same.

In the apparatus described, the above recited resistors, capacitors 90 and 107, especially 107, perform a timing function and, as the timing function is effective through means of the electronic discharge devices 65 and 66, and relays 50 and 60, the said apparatus may be jointly considered as comprising electronic timing means.

For a more complete illustration of the present apparatus, its function will now be related in the following description of operation.

Operation

With the various components of the present apparatus in the operative relation shown, it is noted that relays 30, 40, 50, and 60 are each deenergized and motor 10 is not operating. Plate current is supplied tubes 65 and 66 (and their heaters, not shown, are energized) but the cathode circuits are open. Cathode 69 is connected through wires 120 and 121 to open relay contact 44; through wires 120, 122, and 123 to open switch 38, and through wires 120, 122, and 124 to switch blade 24. The cathode circuit of tube 66 is also open, cathode 72 being connected through wires 126 and 127 to open relay contact 34 and through wires 126 and 128 to open relay contact 46.

A negative bias voltage is being supplied control elements 68 and 71 of tubes 65 and 66, respectively, through circuits previously traced but the potential at said elements is substantially at ground level due to the resistance of the grounding circuits for said elements being substantially less than the resistance of the energizing circuits. In this connection, note that more of resistor 102 is effective than is effective in resistor 86, therefore capacitor 107 will be charged more slowly than capacitor 90, under circumstances to be described, and a negative potential built up more slowly on grid 71 than on grid 68.

Members 11 and 12 may be considered parts of a telescope structure and have previously been ground to close dimensions. To preserve minimum clearances between the members and yet sufficiently refine and improve their mating surfaces, the present lapping operation will be performed. With members 11 and 12 assembled as shown and suitably charged with lapping compound, the operation is started by closing manual switch 38.

Closing switch 38 causes relay 50 to be energized by the circuit: positive power supply terminal 79, wire 130, wire 131, relay winding 51, wire 132, anode 67 of tube 65, cathode 69, wire 120, wire 122, wire 123, switch 38, and wire 133 to ground conenction 134. Tube 65 is conductive because the grid is near ground potential, as previously described and the cathode is now at ground potential. With winding 51 energized, blades 52 and 53 are pulled into engagement with their respective contacts This causes energization of relay 40 by the circuit: line wire 136, wire 137, wire 138, switch arm 52, contact 54, wire 139, winding 41 of relay 40, wire 140, wire 141 to line wire 142. Simultaneously, grid 71 of tube 66 is connected to ground by the circuit: grid 71, wire 109, resistor 110, wire 111, wire 113, switch blade 53, contact 55, and ground connection 143.

Previous to the energizing of relay 40, grid 68 was connected to ground through contact 45, switch blade 42, and ground connection 145, as previously explained. With relay 40 energized, arm 42 is pulled out of engagement with 45 and into engagement with contact 44 thus providing another ground circuit for cathode 69 as follows: cathode 69, wire 120, wire 121, contact 44, blade 42, and ground 145. The manual switch 38 may now be released and allowed to open.

The energizing of relay 40 also affects tube 66 by grounding cathode 72. This causes energization of relay 60 by the circuit: power supply terminal 79, wire 130, winding 61, wire 147, anode 70 of tube 66, cathode 72, wire 126, wire 128, contact 46, switch blade 43, wire 158, and ground connection 145. Tube 66 is conductive due to grid 71 being near ground potential by reason of the aforementioned circuit to ground 143 as well as a connection to ground by the circuit: grid 71, wire 109, resistor 110, wire 111, wire 112, contact 35, blade 32, and ground 148.

The energizing of relay 60 causes relay 30 to be energized by the circuit: line wire 136, wire 137, wire 149, blade 62, of relay 60, contact 63, wire 150, winding 31, and wire 141 to line wire 142. Energizing relay 30 breaks the connection between grid 71 and ground 148 but does not interfere with the connection of grid 71 to ground 143. In addition, when blade 32 is pulled out of engagement with contact 35 and into engagement with 34, another path to ground is provided for cathode 72, the circuit being: cathode 72, wire 126, wire 127, contact 34, blade 32, and ground 148. Further, switch blade 33 is pulled out of engagement with contact 37, thus deenergizing light 39, and into engagement with contact 36. This energizes motor 10 by the circuit: line wire 136, wire 151, switch blade 33, contact 36, wire 152, motor 10, wire 153, and wire 154 back to line wire 142. The circuit for light 39 is: line wire 136, wire 151, blade 33, contact 37, wire 155, light 39, wire 156, and wire 154, back to line wire 142. Note that motor 10 is energized and light 39 deenergized when relay 30 is energized, whereas the light is energized and the motor stopped when relay 30 is deenergized.

With motor 10 energized, shaft 14 and disk 13 are driven in a clockwise direction. Crankpin 15 and connecting rod 16 transform the rotary motion of disk 13 into harmonic reciprocal motion for links 17 and 18 and member 11. With this motion, member 11 comes to a stop at the ends of its strokes and reverses directions and said member attains its highest rate of travel when midway between its end positions. The effect of this is to require maximum torque from motor 10 when member 11 is intermediate its end positions, and to require minimum torque when said member is at either end position. The varying torque on motor 10 causes its force of reaction, or the force exerted on spring means 22, to vary in a similar manner.

With the lapping operation just beginning, the maximum force required for each stroke is relatively large and causes an equally large reactive force. This is sufficient to cause the stator of motor 10 to rotate counterclockwise against the force of spring means 22 sufficiently to engage switch blade 24 with contact 26, this taking place at each stroke. At this point, it is well to mention that spring means 22 is so adjusted that blade 24 will engage contact 26 only when the lapping operation is incomplete but wherein the reaction force is insufficient to cause such engagement when the lapping operation is completed.

While the explanation of operation of the present apparatus has taken some little time, actually the motor 10 is energized almost simultaneously with the closing of switch 38.

When relay 40 was energized, it is noted that the connection of grid 68 to ground 145 was broken. This interrupts the shunt around capacitor 90 and permits a negative charge to be built up in the capacitor 90. This causes a negative potential to be impressed on grid 68. After a relatively short time period, this renders tube 65 non-conducting, hence winding 51 becomes deenergized and arms 52 and 53 drop out of engagement with their respective contacts. This deenergizes relay 40 and breaks the circuit from grid 71 to ground 143. The deenergizing of relay 40 breaks the only active circuit from cathode 69 to ground but reestablishes a circuit from grid 68 to ground, thus discharging capacitor 90 and removing the negative potential from grid 68 so that the tube 65 again may become conductive. Tube 65 and relays 40 and 50 are now in the starting position previous to closing switch 38.

With relay 50 open and the circuit from grid 71 of tube 66 to ground 143 broken, a negative charge is built up in capacitor 107 and a negative potential is impressed on grid 71 to render tube 66 non-conducting. However, wiper 101 is so adjusted on resistor 99, and resistor 102 so adjusted that the rate of charging capacitor 107 is appreciably slower than that of capacitor 90. In this particular instance it may be considered that the lapping operation will continue for one or more strokes or half cycles after opening of switch 38 or contacts 26 and 24 before sufficient negative potential can be impressed on grid 71 to render tube 66 non-conductive and deenergize relays 60 and 30.

As a practical matter, the present apparatus is timed to require continuance of the lapping operation for one and one-half cycles of operation after opening the circuits between cathode 69 and the ground. However, it should be recalled that the reaction force on motor 10 causes switch blade 24 to engage contact 26 once each stroke until the lapping operation is completed. Now, each time blade 24 engages contact 26, cathode 69 of tube 65 is connected to ground 134 by a circuit paralleling that which was initially formed by closing manual switch 38. This causes energization of relays 50 and 40 in the same manner as when the apparatus was started. Energizing relay 50 again establishes the circuit from grid 71 to ground 143 thereby discharging capacitor 107 and removing the negative potential which was building upon grid 71, thus tube 66 remains conductive. Thereby, relays 60 and 30 remain energized and motor 10 continues to operate.

When the lapping operation is completed and the reaction on motor 10 is no longer sufficient to cause engagement of blade 24 with contact 26 at least once in one and one-half cycles, the lapping operation will be stopped. With tube 65 being rendered non-conductive and relays 50 and 40 deenergized, a fraction of a cycle after the opening of manual switch 38 or disengagement of blade 24 and contact 26, tube 66 is now rendered non-conductive. As before noted, opening of relay 50 permits a negative potential to build up on grid 71. While lapping was still being required, this potential would only start to build up before capacitor 107 would again be discharged. However, with the lapping operation completed and the cathode circuit of tube 65 no longer being connected to ground periodically, thus causing periodic operation of relay 50, capacitor 107 is no longer periodically discharged. The charging of capacitor 107 results in a sufficiently large negative potential to be impressed on the grid 71 of tube 66 to render it non-conducting. This causes relay 60 to be deenergized which in turn deenergizes relay 30. Deenergizing relay 30 stops motor 10 and energizes signal light 39 so that the operator may now remove lapped members 11 and 12 and substitute like members to be lapped for a continuation of the above cited operation.

While the apparatus was timed to stop the operation only after one and one-half cycles in which blade 24 failed to engage contact 26, this timing may be varied from one-half cycle, or one stroke, up to any desired number of cycles, or for a predetermined period of time.

While the present apparatus has been rather specifically set forth, this has been done only for clarity of description. Further, while the present apparatus is shown to be ideally adapted for operations in which the motor reaction varies periodically, it is also usuable for operations in which the motor reaction varies uniformly or in any predictable manner. It is obvious that many modifications, substitutions, and alternatives may be used in practicing the present invention, therefore reference is made to the following description of Figures 2 and 3 as representing some of the many practical modifications of the present apparatus.

*Figure 2*

The apparatus shown in Figure 2 differs from that of Figure 1 in that motor 210, driving gears 211 and 212 through reduction gearing 213 and shaft 214, exerts a substantially uniform force which varies in magnitude as the said gears are lapped or run-in. Gear 211 is mounted on shaft 214 while gear 212 is mounted on shaft 215 of braking means 216. Braking means 216 comprises any suitable means for creating some resistance to turning of gear 212, so that sufficient pressure may be exerted by gear 211 on 212 to insure effective lapping action.

A suitable lapping compound is circulated by pump 220 through pipe 221 to the mating surfaces of the gears, and is collected and returned to the pump by trough means 222 and pipe 223.

Motor 210 is energized from line wires 224 and 225 by a circuit controlled by a manual switch 237 or by a relay 229. Thus motor 210 can be energized by operation of manual switch 237 or energization of relay 229.

Relay 229 is conventional and includes a winding 240, a switch blade 228, an "in" contact 230, and an "out" contact 241. "Out" contact 241 controls a signal light 242.

A resistor 233 having a relatively low resistance value is connected in series with motor 210 for causing a potential drop across said resistor which will vary with variations in the current flowing to the motor. A relatively high resistance resistor 245 is connected in parallel with 233 by wires 246 and 247 so that the same potential drop will exist across the same, for a purpose which will appear. A contact 251 is adjustable along resistor 245.

Amplifier 250, of any suitable conventional type, is provided for responding to variations in the current to motor 210 by responding to variations in voltage drop across resistor 245. This amplifier preferably includes means for filtering out the A. C. component in its output current, such as capacitor means indicated by dotted lines in the figure. The output of amplifier 250 is used for controlling relay means, to be described. Operating current for amplifier 250 is taken from the line wires by the following circuit: line wire 224, wire 272, terminal 273, terminal 274, and wire 275 to line wire 225.

Relay 260, controlled by amplifier 250 includes winding 263, switch blade 267 and "in" contact 268. This relay is intended to be operated when a sufficient voltage is impressed on the input terminals of amplifier 250 and may be of a sort requiring at least a predetermined current to pull in. A relay 261, for connection in series with relay 260 includes winding 265, a switch arm 270 and an "out" contact 271, and must be energized by a substantially larger current than relay 260 to pull in.

Operation of Figure 2

With the apparatus set up as shown, and with gears 211 and 212 ready for the lapping operation, the said apparatus may be placed in operation by closing manual switch 237, thus starting motor 210 by the circuit: line wire 224, wire 226, manual switch 237, wire 238, wire 232, resistor 233, wire 234, motor 210, wire 235, wire 236, and line wire 225. Obviously, the resistance of the gears 211 and 212 to turning is greater at the start of the lapping operation and gradually diminishes as the mating surfaces are improved.

With motor 210 operating under a relatively heavy load, the current flow through resistor 233 is relatively high. This results in a relatively high drop in potential across said resistor and a similar drop in potential across resistor 245. The relatively large potential difference across resistor 245, or any part of same, is communicated to input terminals 253 and 249 of amplifier 250 by wires 252 and 248 leading from contact 251 and wire 247, respectively. The relatively large output current from amplifier 250 energizes relays 260 and 261 by the circuit: output terminal 256, wire 262, winding 263, of relay 260, wire 264, winding 265 of relay 261, and wire 266 to terminal 257. This causes relay 260 to pull in but is insufficient to pull in relay 261. With relay 260 pulled in and relay 261 out, relay 229 is energized by the circuit: line wire 225, wire 276, contact 268, blade 267, wire 277, contact 271, blade 270, wire 278, winding 240, and wire 279 to line wire 224.

Energizing relay 229 pulls blade 228 into engagement with contact 230 and completes a circuit to motor 210, as follows: line wire 224, wire 226, wire 227, switch blade 228, contact 230, wire 231, wire 232, resistor 233, wire 234, motor 210, wire 235, wire 236, and line wire 225. When relay 229 pulls in, manual switch 237 is released and permitted to open. Hence, full control of the energization of motor 210 is exercised by relay 229. As in the previous instance, relay 229 is energized almost simultaneously with closing of manual switch 237.

As motor 210 continues to operate and gears 211 and 212 are lapped to smoother and freer engagement, the load on the motor decreases, thus diminishing the current flow through resistor 233 and the input potential to amplifier 250. When the gears turn freely enough to indicate completion of the operation, and the input potential to amplifier 250 is at a predetermined low value, the output current drops too low to hold in relay 260, or ceases, hence said relay drops out and breaks the energizing current to relay 229, which in turn drops out and stops motor 210. When relay 229 drops out, light 242 is energized by the circuit: line wire 224, wire 226, wire 227, blade 228, "out" contact 241, wire 280, light 242, wire 281, and wire 236 to line wire 225. This indicates completion of the operation so that finished gears 211 and 212 may be removed and similar ones needing lapping substituted therefor.

In the event of a set of gears meshing with such difficulty as to indicate a need for further machine operation before proceeding with the lapping operation, or in the event of a motor overload due to other causes, the current flow across resistor 233 is considerable, a high potential is impressed on the input terminals of amplifier 250 and the resulting high output current pulls in relay 261 to deenergize relay 229 and stop the motor 210. Obviously, relay 261 becomes the principal control relay when motor 210 drives an apparatus wherein the load increases to a predetermined value upon completion. Also, if desired, relay 216 may be omitted so that only relay 260 is connected in the output circuit of the amplifier.

To make the present apparatus more flexible so that it can be used for wider range of operations, and especially where greater precision is required in the maximum cut-off current or load, reference is made to Fig. 3 which is described below.

Figure 3

The apparatus of Fig. 3 is a modification of that of Figure 2, and differs therefrom only in the means for controlling the motor in response to increasing loads, overloads and the like. The like parts in this figure are numbered the same and have the same function as in Figure 2.

In addition to the parts described under Fig. 2, a resistor 345, similar to 245, is connected in parallel with resistor 245 by wires 346 and 347. A contact 351 is provided for adjustment over resistor 345.

A second amplifier 350 is provided which preferably is similar to amplifier 250; amplifier 250, in this modification, controls relay 260, and amplifier 350 controls a relay 361.

Relay 361 includes a winding 363, a switch blade 367, and an "out" contact 368. Relay 361 may be similar to relay 261 or may be similar to relay 260, the flexibility of adjustment permitted by the separate amplifier 350 making this relay less critical than its counterpart in Figure 2.

While relays 260 and 361 may jointly control a single relay which controls motor 210, it is preferred to provide a pair of relays for controlling said motor. Motor control relay 229 is controlled by low load relay 260, as in Figure 2, and a high load relay 329 is controlled by relay 361. Relay 329 is similar to relay 229 and includes winding 340, switch blade 328, "in" contact 330 and "out" contact 341. "Out" contact 341 controls signal light 342.

Amplifier 250 is supplied energizing current by the circuit: line wire 224, wire 385, wire 272, terminal 273, and terminal 274 of amplifier 250, wire 275, wire 386, wire 387, and line wire 225. Amplifier 350 is energized by the circuit: line wire 224, wire 385, wire 372, terminals 373 and 374 of amplifier 350, wire 375, wire 387, and line wire 225.

Operation of Figure 3

The present apparatus is placed in operation in the same manner as outlined in the description of Figure 2. Closing manual switch 237 starts the motor 210 and causes an input signal to amplifier 250 due to the voltage drop across resistors 233 and 245. Amplifier 250 energizes relay 260 by the circuit: terminal 256, wire 262, winding 263 of relay 260, and wire 266 to terminal 257. This pulls in relay 229 by the circuit: line wire 225, wire 387, wire 386, wire 388, switch blade 267, contact 268, wire 389, winding 240, wire 279, and line wire 224. Further, if the load on motor 210 is not unduly high, the input signal to amplifier 350 is not sufficient to cause it to pull in its relay 361. As shown, contact 351 is adjusted to make active only a small part of resistor 345, hence the voltage drop across this smaller portion of resistor 345 is less than that causing the signal to amplifier 250. Amplifier 350 receives its input signal by the circuit: contact 351, wire 352, terminal 353, terminal 349, and wire 348 to wire 347. Obviously, this is but one of many ways for adjusting the present apparatus to require specified high load conditions to stop motor 210. For instance, the voltage signal to amplifier 350 might be the same as that to 250 but amplifier 350 would then be adjusted for less gain. Further, relay 361 could be of a sort, or so adjusted, as to require a higher current to pull in. It should be noted that both the low load and high load control points are individually and independently adjustable.

In any event, relay 361 has not pulled in, hence relay 329 is energized by the following circuit: line wire 225, wire 387, wire 390, switch blade 367, contact 368, wire 391, winding 340, wire 379, and line wire 224.

Motor 210 is thus energized by the circuit: line wire 224, wire 226, wire 227, blade 328, contact 330, wire 331, blade 228, contact 230, wire 231, wire 232, resistor 233, wire 234, motor 210, wire 235, wire 236, wire 336, and line wire 225. With motor 210 running and the lapping operation taking place, the action will continue until the load on motor 210 diminishes sufficiently to drop out relay 260 and thus deenergize relay 229, energize light 242, and stop the motor, as in Figure 2.

Should motor 210 be overloaded, or if it is driving a machine wherein the load increases to a predetermined point on completion of the operation, amplifier 350 pulls in relay 361 by the circuit: output terminal 356, wire 362, winding 363 of relay 361, and wire 366 to terminal 357. This breaks the energizing circuit of relay 329 so that it opens, energizes light 342, and stops motor 210. The circuit for light 342 is: line wire 224, wire 226, wire 227, blade 328, contact 341, wire 380, light 342, wire 381, wire 336, and line wire 225.

It is noted that the apparatus of this figure uses the same sort of highly sensitive means for responding to high load as is used for responding to low loads. This apparatus is thus adaptable to a wide field of machine operations, process applications involving mixing, stirring, or the like, and any other operations wherein the load on the driving motor varies in a predictable manner.

The apparatus of each of the above illustrations is seen to comprise highly sensitive and quickly responsive means for controlling motors, which is adaptable equally well and with a minimum of adjustment to large or small motors and to varied operations. As before noted, the present specific showings of this invention are not to be considered in a limiting sense. Many substitutions, modifications, and alternatives are apparent upon studying the present disclosure, therefore the scope of this invention should be determined only by the appended claims.

I claim as my invention:

1. In power driven mechanism wherein the operating power required cyclically varies in a predetermined manner, means for controlling the operation of said mechanism, means responsive to the cyclic peak power requirements of said mechanism, and means controlled by said responsive means for regulating said operation controlling means.

2. In a machine, in combination, means for improving the fit of relatively movable interfitting parts, motor means for operating said improving means, means responsive to the load on said motor means, means for controlling said motor means, means for indicating stoppage of said improving means, and means controlled by said load responsive means for stopping said improving means and operating said indicating means when said load decreases to such a value as to indicate the completion of the fit improving operation.

3. In a lapping machine, in combination, motor means for driving said lapping machine in the performance of lapping operations, means responsive to the load on said motor means, relay means for controlling said motor means, and amplifier means regulated by said load responsive means, said amplifier means being connected for operating said relay means in a manner to stop said motor means when said load reaches a predetermined precise low value indicative of the completion of the lapping operation.

4. In a machine for running-in interfitting parts and wherein the power required for the machine varies in a substantially uniform manner, motor means for supplying power to the machine, means responsive to the power requirements of the machine, means for controlling said motor means, and amplifier means regulated by said power responsive means, said amplifier means operating said motor controlling means in a manner to stop said motor when the power requirements for the machine reaches a predetermined relatively exact value.

5. In a lapping machine for working-in interfitting parts and wherein the power required for the machine varies in a substantially uniform and predictable manner, motor means for supplying power to the machine, means responsive to the power requirements of the machine, means for controlling said motor means, and amplifier means regulated by said power responsive means, said amplifier means operating said motor controlling means in a manner to stop said motor when the power requirements for the machine reaches a predetermined precise low or high value.

6. In a precision material working machine wherein the power requirements for a specified operation vary in a substantially uniform manner and reach a predetermined value upon completion of the operation, said value being appreciably higher than the no-load value of the machine, motor means for driving said machine, relay means for controlling said motor means, manually operated means for also controlling said motor means, means responsive to the load on said motor means, and amplifying means regulated by said load responsive means for operating said relay means upon said load reaching a predetermined relatively exact value.

7. In a machine for improving the running fit of machine parts, in combination, electric motor means for driving at least one of said machine parts, electrical circuit means for energizing said motor means, relay means for controlling said circuit means, manually operated switch means for also controlling said circuit means, means responsive to the value of the current in said circuit means, and sensitive amplifier means controlled by said current responsive means for operating said relay means to stop said motor means when said current value reaches an amount indicative of the attaining of the desired running fit between said parts.

8. In a material working machine wherein the power requirement of a specified operation of the machine varies in a cyclic manner and wherein the maximum load per cycle also varies as the operation is completed, motor means for driving said machine, means responsive to the load on said motor means, electric circuit means for energizing said motor means, switch means for said circuit means, and means controlled by said load responsive means for operating said switch means to stop said motor means when the maximum load on said motor means varies a predetermined extent over a predetermined period of time.

9. In a precision material working machine wherein the power requirement of a specified operation of the machine varies in a cyclic manner and wherein the maximum load per cycle also varies as the operation is completed, motor means for driving said machine, means responsive to the load on said motor means, electric circuit means for energizing said motor means, switch means for said circuit means, and means controlled by said load responsive means for operating said switch means to stop said motor means when the maximum load on said motor means varies a predetermined extent over a predetermined number of cycles.

10. In a material working machine wherein the power requirements of a specified operation of the machine varies cyclically and wherein the maximum load per cycle varies in a predictable manner as the operation proceeds, in combination, motor means for driving said machine, means responsive to the load on said motor means, an electric circuit for energizing said motor means, relay means controlling said circuit, and means including electronic timing means for operating said relay means when said load does not vary a predetermined amount during a predetermined time interval, said timing means being controlled by said load responsive means.

11. In a material working machine wherein the power requirements of a specified operation of the machine varies cyclically and wherein the maximum load per cycle varies in a predictable manner as the operation proceeds, in combination, motor means for driving said machine, means responsive to the load on said motor means, an electric circuit for energizing said motor means, relay means controlling said circuit, timing means for controlling said relay means, and electronic means controlled by said load responsive means and said timing means so that said relay means will be operated when the maximum load per cycle does not rise above a predetermined value for a predetermined number of cycles of machine operation.

12. In a machine wherein the power requirements of an operation of the machine varies in a predictable manner upon completion of said operation, in combination, motor means for driving said machine, means responsive to the load on said motor means, means for controlling said motor means, timing means, and means actuated by said load responsive means and regulated by said timing means for controlling said motor means in a manner to stop said operation when the load on said motor means maintains a value indicating completion of the operation for a predetermined period of time.

13. In a motor driven machine for performing an operation wherein the torque required by the machine varies in a predetermined manner as the operation is completed, in combination, means for controlling the operation of said machine, reaction means responsive to the torque requirements of the machine, and sensitive relay means regulated by said torque responsive reaction means for stopping the said operation when said torque requirements decrease to a value indicating completion of the operation.

14. In a motor driven machine for performing an operation wherein the power required by the machine varies in a predetermined manner as the operation nears completion, in combination, means for controlling the operation of said machine, means including an amplifier responsive to the power requirements of the machine, and sensitive relay means regulated by said power responsive means for stopping the said operation when said power requirements rise to a value indicating completion of the operation.

15. In a motor control apparatus, in combination, means for responding to the load on a motor, electronic amplifier means regulated by said load responsive means, relay means requiring a predetermined minimum current for operation, another relay means requiring a predetermined and substantially larger current for operation, and means connecting both of said relays in series with the output of said amplifier means.

16. In a motor control apparatus, in combination, means for responding to the load on a motor, first electronic amplifier means regulated by said load responsive means, relay means operated by said amplifier means when said load reaches a first predetermined value, said electronic amplifier means being regulated by said load responsive means, and other relay means operated by said second amplifier means when said load reaches a second predetermined value.

17. In a motor control apparatus, in combination, means for responding to the load on a motor, first relay means, timing means controlled by said load responsive means, said timing means controlling said first relay means, and second relay means controlled by said first relay means for controlling said motor.

STANLEY R. FOLSOM.

REFERENCES CITED

The following references are of record in the file of this patent:

UNITED STATES PATENTS

| Number | Name | Date |
|---|---|---|
| 1,549,970 | Hall | Aug. 18, 1925 |
| 1,867,280 | Rippl | July 12, 1932 |
| 2,240,822 | Adams | May 6, 1941 |

FOREIGN PATENTS

| Number | Country | Date |
|---|---|---|
| 221,029 | Great Britain | Sept. 4, 1924 |